United States Patent [19]

Druss, deceased et al.

[11] 4,227,106
[45] Oct. 7, 1980

[54] HIGH VOLTAGE INDUCTION MOTOR WITHOUT LADDER INSULATION BETWEEN MOTOR WINDINGS AND METHOD OF CONSTRUCTION THEREFOR

[75] Inventors: Raymond Druss, deceased, late of Florissant, Mo., by Marian A. Druss, executrix; Glenn Hoffmeister, Crestwood, Mo.

[73] Assignee: Emerson Electric Co., St. Louis, Mo.

[21] Appl. No.: 664,060

[22] Filed: Mar. 4, 1976

[51] Int. Cl.³ .................................................. H02K 3/00
[52] U.S. Cl. .................................. 310/184; 310/194; 310/198; 310/68 C; 310/72
[58] Field of Search ..................... 310/188–208, 310/179, 180, 184, 190, 194, 68 C, 72, 214, 215; 318/221 D, 225

[56] References Cited

U.S. PATENT DOCUMENTS

| | | | |
|---|---|---|---|
| 2,796,543 | 6/1957 | Dunn | 310/202 |
| 2,812,459 | 11/1957 | Smith | 310/202 |
| 3,204,167 | 8/1965 | Zigler | 318/225 |
| 3,219,857 | 11/1965 | Fisher | 310/215 |
| 3,334,255 | 8/1957 | Peters | 310/215 |
| 3,633,057 | 1/1972 | Smith | 310/184 |
| 3,774,062 | 11/1973 | Johnson | 310/184 |
| 3,821,602 | 6/1974 | Linkous | 310/198 |
| 3,887,854 | 6/1975 | Parks | 310/198 |
| 3,940,646 | 2/1976 | Buckman | 318/225 |

FOREIGN PATENT DOCUMENTS 774187 12/1934 France .................................. 318/221

*Primary Examiner*—R. Skudy
*Attorney, Agent, or Firm*—Polster, Polster and Lucchesi

[57] ABSTRACT

A permanent split capacitor induction motor rated at 460 volts AC is provided with first and second main winding parts and an auxiliary winding. The motor includes a core of magnetic material having a plurality of winding receiving slots formed in it. The main and auxiliary windings are constructed from a plurality of wire turns arranged in coil sets. The auxiliary winding is placed adjacent the first main winding part in the core slots, and is electrically connected to it. The coil sets of the auxiliary winding are separated from the coil sets defining the second main winding part by the coil sets of the first main winding part. Individual wire turns are distributed in the slots of the motor and positioned so that the voltage between coil sets forming the main winding parts and the auxiliary winding can never exceed the voltage across the capacitor. Because of the low voltage between coil sets, the coil sets of the respective windings may be placed in the slots without the use of additional insulation between coil sets other than the insulative coating provided on the wire used for coil set construction.

7 Claims, 12 Drawing Figures

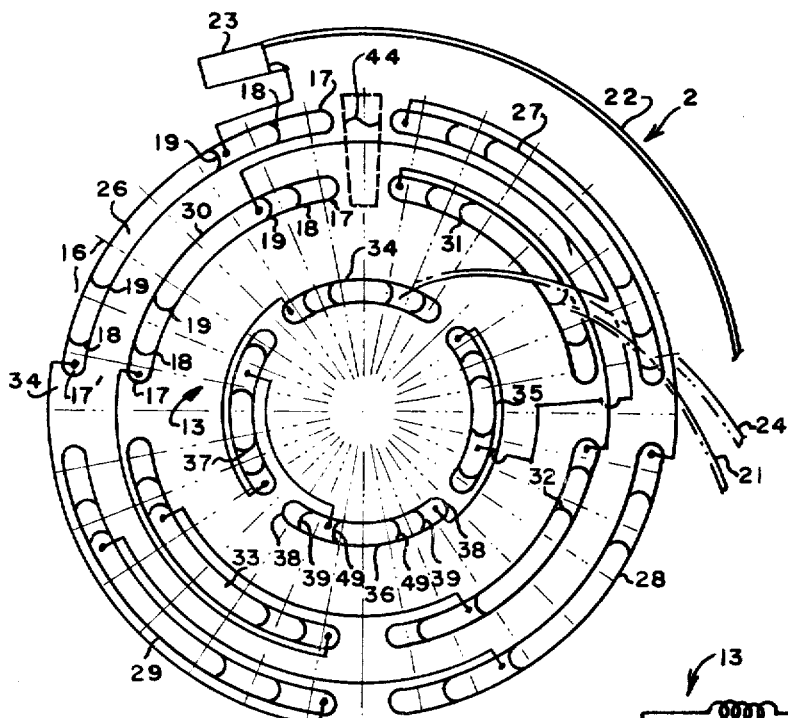
FIG.1.
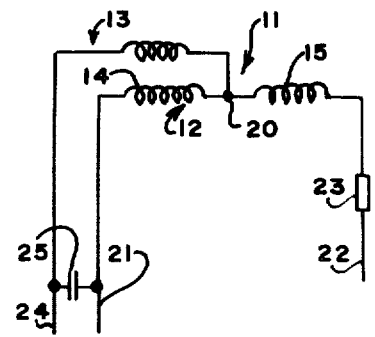
FIG.5.
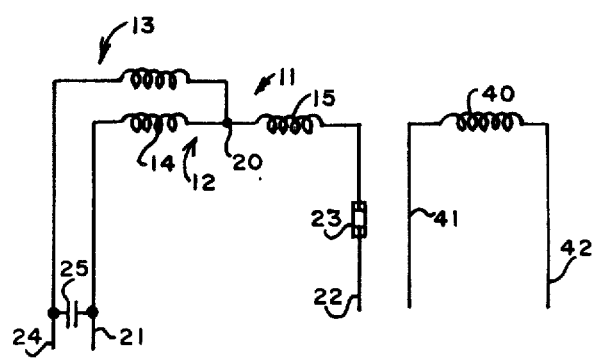
FIG.6.
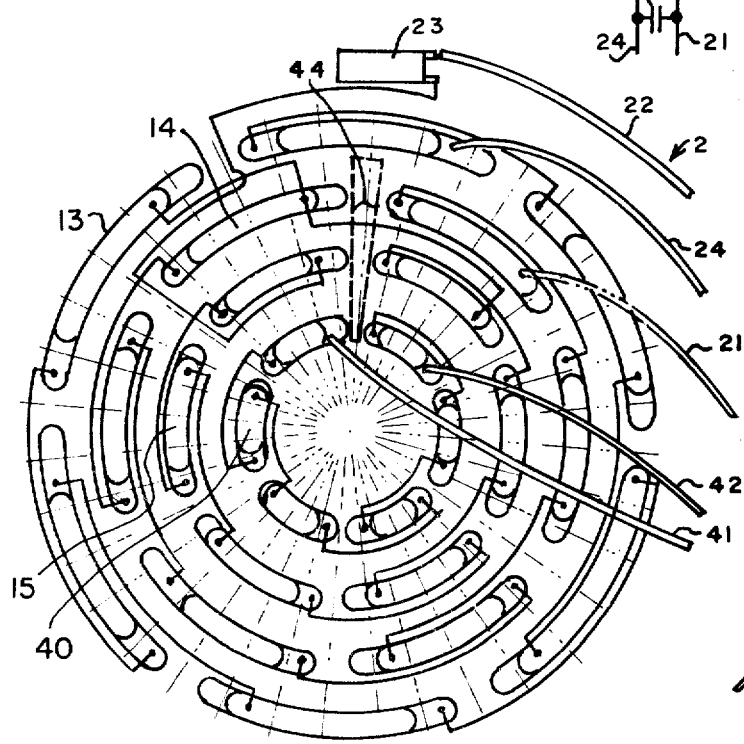
FIG.4.
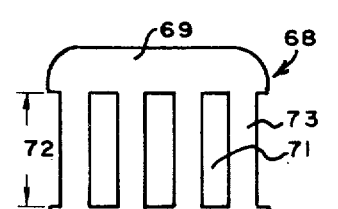
FIG.7a
PRIOR ART
7b
7c

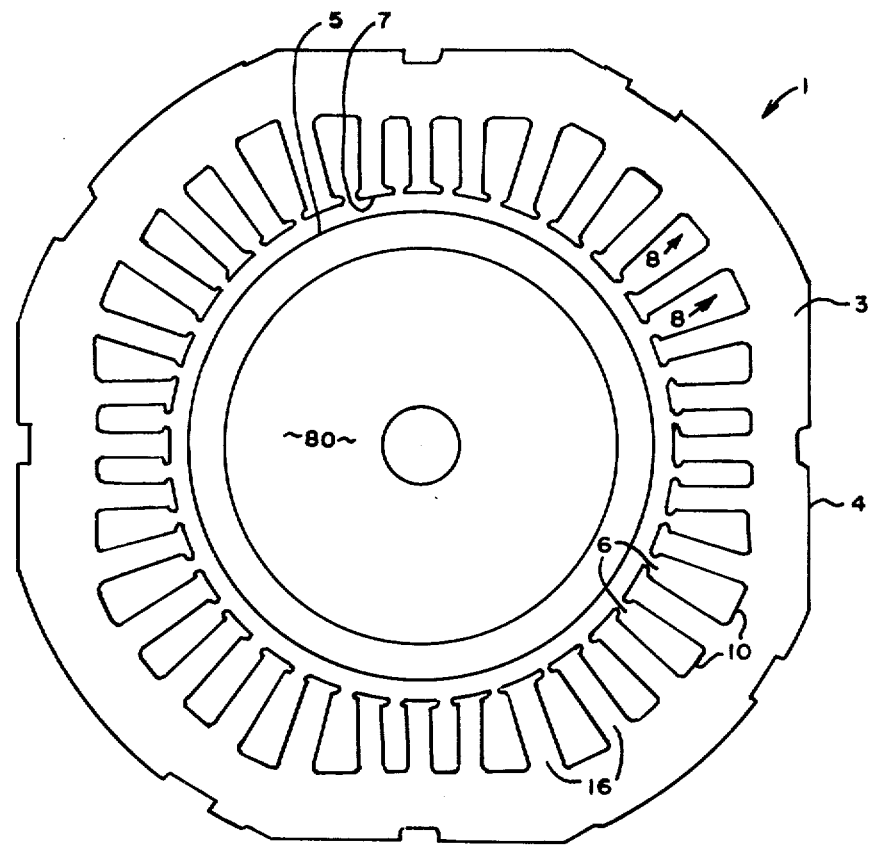
FIG. 8.
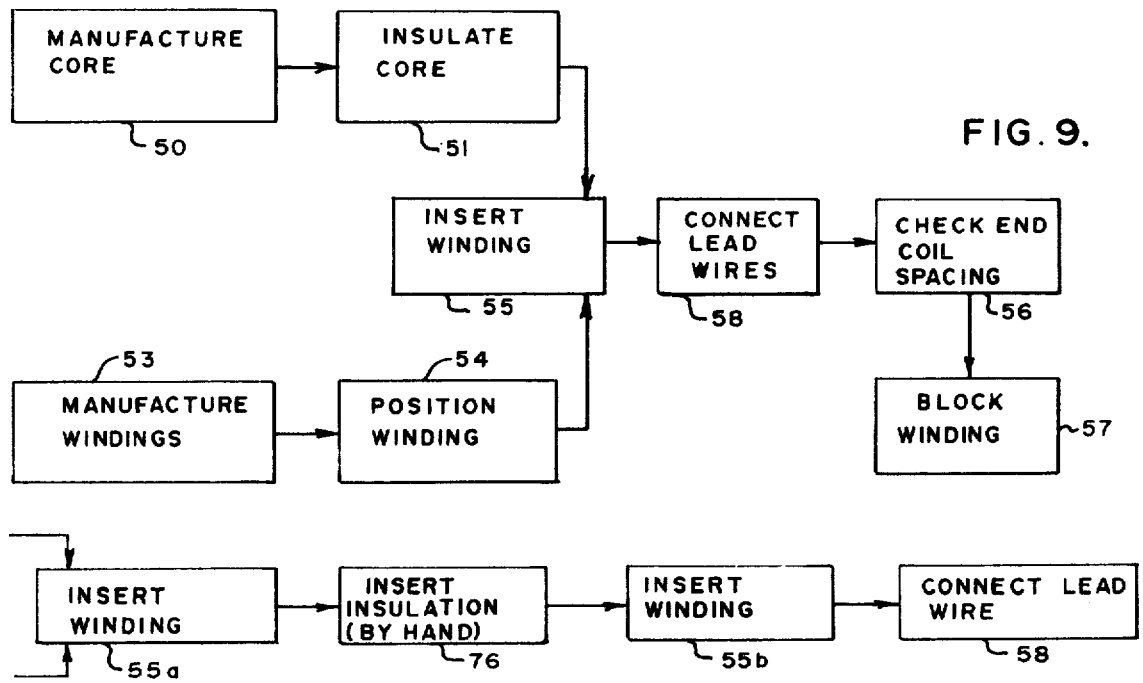
FIG. 9.
FIG. 10.
PRIOR ART

HIGH VOLTAGE INDUCTION MOTOR WITHOUT LADDER INSULATION BETWEEN MOTOR WINDINGS AND METHOD OF CONSTRUCTION THEREFOR

BACKGROUND OF THE INVENTION

This invention relates to induction motors, and in particular to permanent split capacitor induction motors rated at 460 volts AC. The notation "permanent split capacitor" is a term applying to a single phase induction motor having a main winding arranged for direct connection to a source of power and an auxiliary winding connected to a capacitor, the capacitor and auxiliary winding being electrically connected to a source of power during both starting and running operations. While the invention is described in detail with respect to 460 volt motors, those skilled in the art will recognize the applicability of the invention to a variety of high voltage motors, for example, rated between 440 to 600 volts.

Induction motors having voltage ratings over 440 volts have created operating problems not prevalent in motor designs operable at lower rated voltages. For example, it is known that high voltages between the windings of an induction motor can cause break down of the insulation system normally inserted between the windings, resulting in motor failure. The insulation system utilized with the majority of motors presently available in the art makes use of insulation ladders between coil sets of the motor windings. That is to say, insulation is placed between the coil sets of at least the auxiliary and the main windings whenever the coil sets share slots in the stator assembly. That insulation commonly has an axial length which extends inwardly from the ends of the stator and has a plurality of slits cut in it which permit insertion of the insulation in the slots. The slits give the insulation the appearance of a ladder. Consequently, the insulation is known in the art as an insulation ladder. Insulation ladders conventionally are constructed from material available from the E. I. duPont de Nemours and Company under the trademarks "Mylar" and "Nomex". In general, Nomex has a higher dielectric constant than Mylar, but is more susceptible to physical puncture during motor manufacture.

The use of insulation ladders in induction motors is an old expedient. In the past, it was considered necessary to use insulation between coil sets of all motor windings in order to prevent motor failure. Advancements in wire coatings used in conjunction with wire manufactured for dynamoelectric machines, known in the art and for the purposes of this specification as magnet wire, have increased the dielectric constant of the wire films to the point where the wire itself provides an effective insulative barrier between the turns of the coil sets forming the windings, particularly at the most common voltage sources applied to dynamoelectric machines, that is, 115 or 230 volts. It therefore has been the practice to eliminate the insulation ladders in induction motors operating at 115 and 230 volts, assuming other operating conditions do not permit voltages between coil sets to exceed the insulation breakdown voltage of the insulation film of the wire. However, wire film insulation alone is insufficient to protect against a short circuit between coil sets of the winding as the voltage between coil sets approaches 400 volts. Since 460 volt induction motors operate at voltages higher than the insulation breakdown voltages of the wire insulation, elimination of the insulation ladders for these motors was believed unfeasible.

The invention disclosed hereinafter makes the elimination of insulation between coil sets of motors having rated voltages above 440 possible by constructing the main winding in two parts, and electrically connecting the auxiliary winding across one main winding part. The auxiliary winding is placed in the stator assembly so that it is adjacent the main winding part across which it is connected. The auxiliary winding also is separated from the second main winding part by the first main winding part. This arrangement means that the voltages between coil sets of the winding all are within the voltage capabilities for the insulation films utilized in conjunction with the coil sets. Insulation between the coil sets thus may be eliminated, resulting in a considerable reduction in motor manufacturing costs and providing a more reliable motor design in that high voltages between coil sets are eliminated.

One of the objects of this invention is to provide a 460 volt rated induction motor which eliminates the use of insulation ladders between coil sets of the winding for the motor.

Another object of this invention is to provide a more economical motor design for an induction motor rated between 440 and 600 volts AC.

Yet another object of this invention is to provide a more reliable induction motor operable at 460 volts AC.

Other objects of this invention will be apparent to those skilled in the art in light of the following description and accompanying drawings.

SUMMARY OF THE INVENTION

In accordance with this invention, generally stated, a high voltage, for example, 460 volt AC induction motor has an auxiliary winding and a main winding positioned within a stator assembly without use of additional ladder insulation between the windings. In the embodiments illustrated, the main winding includes a first main winding part and a second main winding part constructed from a plurality of wire turns distributed in the stator slots in a sinusoidal distribution pattern. An auxiliary winding also is sinusoidally distributed in the stator slots. The auxiliary winding is electrically connected across the first main winding part and is shifted 90 electrical degrees from it. The first main winding part is inserted in the slots adjacent the auxiliary winding and the second main winding part always is separated from the auxiliary winding by the first main winding part. The ends of the first and second main winding parts are physically separated from one another during motor manufacture. A method of motor manufacture which eliminates the use of ladder insulation between the windings of a dynamoelectric machine having a rated voltage between 440 and 600 volts AC.

BRIEF DESCRIPTION OF THE DRAWINGS

In the drawings, FIG. 1 is a diagrammatic view showing the relative angular position of the coil sets for a winding of one illustrative embodiment of the motor of this invention, the electrical connections between coil sets, and the connection of the coil sets to a thermal protector, for a four-pole, 460 volt motor design;

FIG. 4 is a diagrammatic view showing a relative angular position of the coil sets for a winding of a third illustrative embodiment of the motor of this invention, the electrical connections between coil sets, and the connection of the coil sets to a thermal protector, for a six-pole, two-speed, 460 volt motor design;

FIG. 5 is a schematic view of the windings for the motor shown in FIG. 1;

FIG. 6 is a schematic view of the windings shown in FIG. 4;

FIG. 7a is a top plan view illustrating typical ladder insulation utilized in conjunction with prior art motor designs;

FIG. 7b is a view in perspective of slot insulation utilized in conjunction with the motor of this invention;

FIG. 7c is a view in perspective of wedge insulation utilized in conjunction with the motor of this invention;

FIG. 8 is a top plan view of a core assembly compatible with the winding design illustrated in FIG. 1;

FIG. 9 is a flow diagram illustrating the construction of the motor designs shown in FIGS. 1, 3 and 4; and FIG. 10 is a flow diagram illustrating the construction of prior art motor designs having a rated voltage between 400 and 600 volts.

DESCRIPTION OF THE PREFERRED EMBODIMENT

Figure 3:
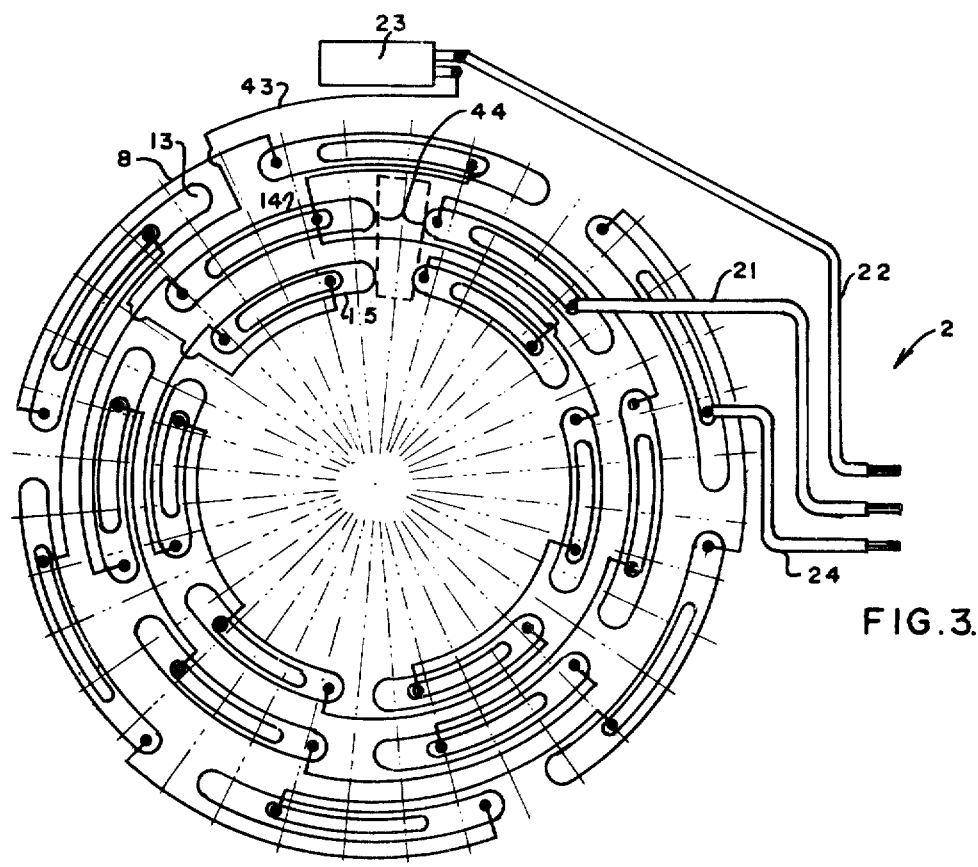
FIG. 3 is a diagrammatic view showing the relative angular position of the coil sets for a winding of a second illustrative embodiment of the motor of this invention, the electrical connections between coil sets, and the connection of the coil sets to a thermal protector, for a six-pole, 460 volt motor design.

Referring now to the drawings, and in particular to FIG. 8, reference numeral 1 indicates a core assembly for an induction motor 2, variations of which are diagrammatically illustrated in FIGS. 1, 3 and 4. The core assembly 1 includes a core 3 constructed from a plurality of laminations 4 having similar design features. Those skilled in the art will recognize that the design of the lamination 4 in silhouette, slot number, and slot shape, for example, may vary in embodiments of this invention. In general, the laminations 4 have a central opening 5 formed in them. A plurality of radially outwardly extending receptacles 6 communicate with the opening 5 on one end, and are closed along a second end 10. That part of the laminations 4 defining one side of successive ones of the receptacles 6 and the open mouth portion of the recepacles, are known in the art as a tooth 16. The particular lamination 4 shown has 32 of the recepacles 6 formed in it and is intended to receive a four-pole winding, later described in greater detail. When aligned in stacked relationship, the central opening 5 defines an axially extending bore 7, and the receptacles 6 define axially extending slots 8. The bore 7 receives a rotor assembly 80 in a usual manner. The rotor assembly 80 is conventional and is not described in detail. The laminations 4 are joined to one another by any convenient method. Welding, cleating, adhesive bond or combinations of these methods work well, for example. After core manufacture, but prior to winding insertion, a slot insulator 9, shown in FIG. 7b, is inserted along the closed end 10 portion of the slots 8.

A motor winding 11 is illustrated diagrammatically in FIG. 5. As there shown, the winding 11 includes a main winding 12 and an auxiliary winding 13. The main winding 12 in turn is divided into two parts, a first main winding part 14 and a second main winding part 15. The winding parts 14 and 15 are connected to one another at a connection node 20. A motor lead 21 is connected electrically to one end of the winding part 14, while a motor lead 22 is connected electrically to an end of the winding part 15 through a motor protector 23. The auxiliary winding 13 is connected to the node 20 at one end, and to a motor lead 24 at its second end. A capacitor 25 is electrically connected between the auxiliary winding 13 and the main winding part 14. The motor leads 21, 22 and 24 are utilized to connect the motor 2 to a source of 460 volt AC electrical energy, not shown.

The main winding portions 14 and 15, in the embodiment illustrated, are identical and each portion is constructed from a plurality of winding coil sets. The winding part 15 includes coil sets 26, 27, 28 and 29, while the winding part 14 includes coil sets 30, 31, 32 and 33. Each of the coil sets of the winding parts 14 and 15 are constructed from a plurality of wire turns constructed from magnet wire. As indicated above, those skilled in the art will recognize that the term magnet wire refers to a suitable electrical conductor, coated with an insulation film. As previously described, the lamination 4 required for the reception of the winding illustrated in FIG. 1, is a 32-slot lamination design. The turns of the winding parts 14 and 15 are wound over 3, 5 and 7 of the stator teeth 16, as diagrammatically illustrated in FIG. 1. Thus, the coil sets comprising the main winding 12 each contain three coils 17, 18 and 19, which are wound respectively over 7, 5 and 3 teeth 16 of the core assembly 3. The individual wire turns of each of the coil sets comprising the main winding 12 include a longitudinally extending portion carried in the slots 8, and a loop or end turned portion carried along the outboard ends of the core and connecting successive ones of the longitudinally extending straight conductor run portions of the wire turns. The wire turn distribution is conventional, and is known in the art and for purposes of this specification as sinusoidal distribution. Sinusoidal distribution is a term of art and refers to the wire turn distribution in the slots 8 that will result in the generation of an approximate sinusoidal flux upon application of voltage to the windings.

As indicated above, the total turns for the coil sets comprising the winding parts 14 and 15 are divided approximately in half so that the number of wire turns in the coil sets 26 through 29 of the main winding part 15 equal the number of wire turns in the coil sets 30 through 33 of the second main winding part 14. Where sinusoidal distribution results in an odd number of turns, the number of turns is made even and divided in half. Thus, the total number of wire turns of the main winding 12 in a slot 34 of the core 3 is the sum of the turns contained in a coil 17 and a coil 17' of the coil sets 30 and 26, respectively. Like constructional features apply to each of the coil sets of the main winding 12.

The auxiliary winding 13 also is constructed from a plurality of coil sets indicated by the numerals 34, 35, 36 and 37 in FIG. 1. Each of the coil sets for the auxiliary winding 13 are constructed from a plurality of wire turns formed from conventional magnet wire material. The turns of the auxiliary winding 13 are wound over seven, five and three teeth 16 of the core assembly 3. Thus, each of the coil sets 34 through 37 contain three coils, 38, 39 and 49, which are constructed from a plurality of wire turns. Again, the individual wire turns of each of the coils of the auxiliary winding 13 include a longitudinally extending portion carried in the slots 8, and a loop or end-turned portion carried along the outboard ends of the core 3 connecting successive ones of the longitudinally extending, straight conductor run portions of the wire turns. Wire turn distribution for the auxiliary winding also is conventional and is similar to that described for the main winding 12.

FIG. 3 represents a six-pole version of the motor shown in FIG. 1. One of the primary differences between the embodiments of FIGS. 1 and 3, in addition to the obvious variation in number of poles, is the location of the auxiliary winding 13. In FIG. 3, the auxiliary winding 13 is the first winding in the slots 8 so that it is positioned along the slot bottom 10 portion of the core 3. That is to say, the auxiliary winding 13 is placed in the slots 8 of the core assembly 3 so that the main winding parts 14 and 15 are inboard of the auxiliary winding 13. Other constructional features of the embodiment of FIG. 3 are similar to the four-pole design, and are not described in detail. The individual coils of the coil sets defining main and auxiliary windings 12 and 13 however, are wound over 3 and 5 teeth, only two such coils being utilized in the six-pole embodiment of FIG. 3. Again, it may be noted that the main winding part 14 is placed adjacent the auxiliary winding 13 so that the main winding part 15 is spaced from the auxiliary winding 13 by the main winding part 14.

FIG. 4 illustrates a six-pole, two-speed motor design embodiment of our invention. As with the embodiment of FIG. 3, the auxiliary winding 13 is placed in the bottom of the slots 8, and the main winding parts 14 and 15 are placed radially inboard of the auxiliary winding 13. The equivalent circuit for the embodiment of FIG. 4 is shown in FIG. 6. Like reference numerals have been utilized for like parts, where appropriate. In the motor embodiment of FIG. 4, however, an additional main winding 40 is placed in the slots 8, radially inboard of the main winding 12. The ends of the second main winding 40 are connected to a motor lead 41 and a motor lead 42, which are connected to a source of electrical energy, not shown. Other constructional features of the motor are similar to those described above with the four-pole design of FIG. 1. As indicated above, those skilled in the art will recognize that lamination design, slot number total and slot configuration all may vary for the motor embodiments shown in FIGS. 3 and 4 over those described in conjunction with FIG. 1.

Figure 2:
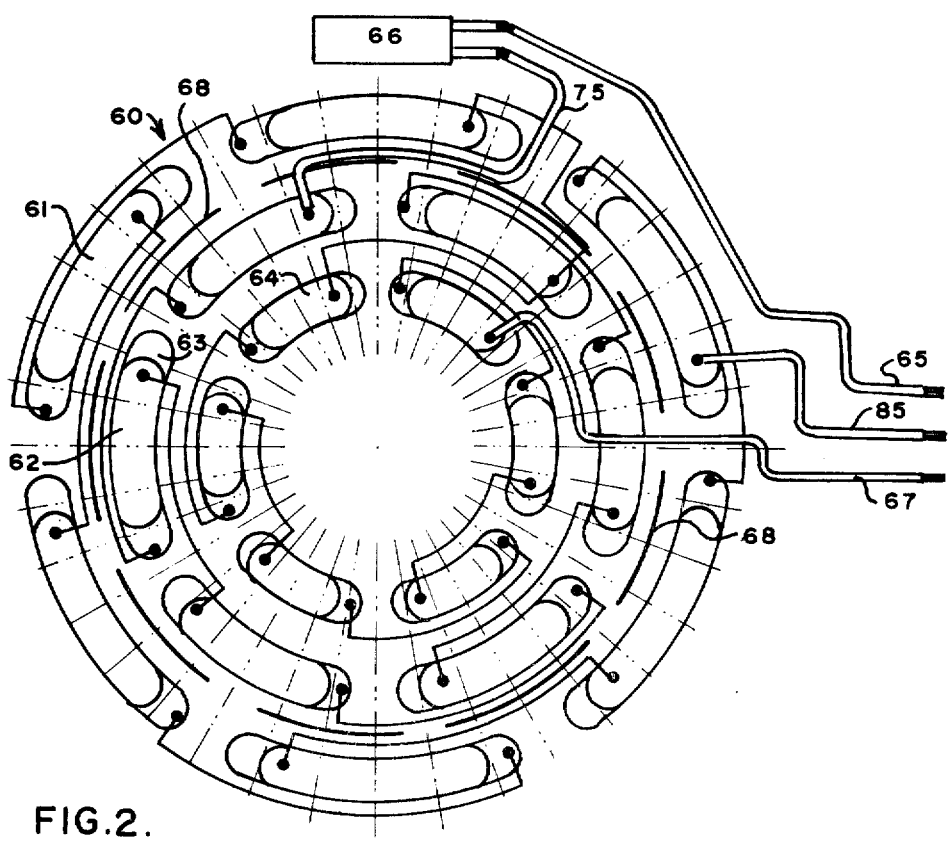
FIG. 2 is a diagrammatic view of a prior art motor design showing the relative angular position of the coil sets of a six-pole, 460 volt motor prior to the invention disclosed herein.

FIG. 2 illustrates a prior art six-pole motor design which this invention replaces. This prior art motor design is described briefly so that the important distinctions between what has been done before and our invention readily are apparent. As shown in FIG. 2, a motor 60 includes an auxiliary winding 61 and a main winding 62. The main winding 62 is defined by a first main winding part 63 and a second main winding part 64. The auxiliary winding 61 and the main winding 62 may be constructed in a manner similar to that described in conjunction with the motor 1 shown in FIGS. 1, 3 and 4.

A lead 65 is electrically connected to a protector 66 and to one end of the main winding 62. A lead 85 is electrically connected to one end of the auxiliary winding 61. A lead 67 is electrically connected to a second end of the main winding 62. It may be observed, in FIG. 2, that when rated voltage (460 volts) is applied to the motor leads, the voltage between the auxiliary winding 61 and the main winding 62 will exceed 400 volts. For that reason, it is the practice in the motor industry to provide ladder insulation 68 between the auxiliary winding 61 and the main winding 62.

Ladder insulation 68, best seen in FIG. 7a, is conventional and generally is constructed from suitable insulating material. The above-described "Mylar" and "Nomex" materials commonly are used. The insulation ladder 68 has a top 69 and a bottom 70. A plurality of slits 71 are made in an axial length portion 72 of the ladder insulation 68. The length 72 is chosen to permit individual rungs 73 of the insulation ladder 68 to fit within the slots 8 of the core 3. The ends 69 and 70 are sized to permit their extension into the end turn portion of the windings. The ends 69 and 70 function to protect the coils of the auxiliary and the main windings from one another along the end turn portions of those windings.

As observable in FIG. 3, the motor lead 22 is connected to the protector 23, and to one side of the winding part 15 through a conductor 43. That connection, however, is made so that the winding part 14 is positioned between the auxiliary winding 13 and the winding part 15. In FIG. 2, the lead 65 is connected to the protector 66. A conductor 75 is connected between the protector 66 and a winding part of the main winding 62 having a voltage of 460 volts imposed on it. Consequently, the voltage between the auxiliary winding 61 and various coils of the main winding 62 exceeds the insulation rating of known wire films, and the use of some form of insulation ladder 68 is required. In addition, the motor embodiments shown in FIGS. 1, 3 and 4 have an area 44 associated with them, indicated in phantom lines in the drawings, in which the ends of respective coil sets of the main winding parts 14 and 15 are separated by at least a distance of 3/32 of an inch. The physical separation together with the proper placement of the coils means that the insulation ladder 68 may be eliminated between the auxiliary and main windings of motor embodiments of this invention. This has resulted in a notable cost differential between motors of our invention and those available in the prior art. The maintenance of voltage levels within the ability of the insulative film of the wire also results in more reliable motor products, as the voltage relationship between windings necessarily is lower than analogous prior art designs.

FIG. 9 is a block diagrammatic view of the constructional steps used in manufacturing the motor of this invention. As there shown, the core 3 is constructed in a manufacturing step 50 and the core is insulated by use of the slot insulation 9, shown in FIG. 7b, in a core insulation step 51. The motor windings are manufactured by any convenient means in a winding manufacturing step 53. For example, the windings may be constructed on plastic winding tools on winding machines described in the U.S. patent to Kieffer, U.S. Pat. No. 3,714,973, issued Feb. 6, 1973. The windings then are positioned on a machine that inserts windings axially. For example, axial winding insertion machines, described in the U.S. patent to Hill, U.S. Pat. No. 3,324,536, may be used for insertion. Axial insertion machines conventionally also insert slot wedges 74, an example of which is shown in FIG. 7c, which function to close the area between adjacent teeth 16, shown in FIG. 8. The winding position step is indicated by the numeral 54, while the insertion step is indicated by the reference numeral 55 in FIG. 9. Generally, it is possible to insert the entire motor winding 12 with a single pass of the axial insertion machine. However, multiple passes may be made to insert the windings, if desired. Thereafter, the space along the area 44 is checked for proper spacing. The check may be accomplished by any suitable measuring gauge, not shown. The spacing check is shown by the reference numeral 56 in FIG. 9. After the spacing check, the winding end turns may be blocked in a step 57. If desired, the blocking may be accomplished prior to the end coil spacing check step 56 in order to ensure proper dimensions after the blocking step. The lead wires are connected in a step 58. As indicated, the connection is made so that the auxiliary winding 13 is adjacent the first main winding part 14, and is separated from the second winding part 15 by the first main winding part 14. This relationship is important because it prevents the voltages between main and auxiliary winding coil sets ever from reaching a value high enough to cause insulation breakdown of the wire film on the wires used in coil construction. Suitable insulation sleeves for protecting the winding connections may be employed, where appropriate.

Other additional conventional manufacturing or testing steps may be taken, if desired. For example, the stator assembly may be dipped in an epoxy varnish and cured. The windings themselves often are subjected to electrical continuity and insulation integrity checks. Such additional steps are compatible with our invention.

In distinction to the method described in conjunction with FIG. 9, the prior art method illustrated in FIG. 10 breaks the insert step 55 into a step 55a, followed by a ladder insulation insertion step 76. The insulation commonly was inserted by hand. Thereafter, the remaining winding parts were inserted in a step 55b. Remaining constructional steps are the same as those described in conjunction with FIG. 9. It is apparent that the method of our invention effects a substantial cost reduction over previously utilized techniques.

Numerous variations, within the scope of the appended claims, will be apparent to those skilled in the art in light of the foregoing description and accompanying drawings. Thus, the slot distribution of turns placed in the slots 8 may be something other than the sinusoidal distribution described. The silhouette, slot number, and shape of the slots shown in the drawings may be varied in other embodiments of this invention. Although all embodiments of the invention utilize a serially connected main winding 12, those skilled in the art will appreciate that the main winding may be connected in parallel, if desired. Wire sizes needed for motors having their windings connected in parallel usually are difficult to manufacture because of the wire sizes required in motors rated at 440 volts and above. These variations are merely illustrative.

Having thus described the invention, what is claimed and desired to be secured by Letters Patent is:

1. A permanent split capacitor induction motor having an input voltage at and above 440 volts, comprising:
a rotor; and
a stator assembly, said stator assembly including a core of magnetic material, said core being constructed from a plurality of individual laminations, said laminations having a central opening in them, and a plurality of receptacles extending radially outwardly from said central opening, the receptacles defining winding receiving, closed bottom slots and the central opening defining a rotor receiving bore, insulation means along at least the closed bottom portion of said slots, windings in said slots, said windings including a main winding and an auxiliary winding, said main winding comprising a first winding part and a second winding part, each of said first and said second main winding parts comprising a plurality of wire coil sets constructed from a number of individual wire turns, said wire turns being constructed from magnet wire, said magnet wire including an insulation film about an electrical conductor, said first and said second main winding parts being connected in series to one another, said auxiliary winding being connected in parallel with said first main winding part, said auxiliary winding being positioned in said slots adjacent the coil sets of the main winding part with which it is electrically connected, said auxiliary winding and said first main winding part being placed adjacent one another in said slots so that at least some wire turns of said main and said auxiliary windings are continuous with one another along the insulation coating of the magnet wire from which said windings are constructed, said auxiliary winding being separated from said second main winding part by said first main winding part.

2. The motor of claim 1 further characterized by winding protection means electrically connected to said main winding.

3. The motor of claim 2 further characterized by a capacitor electrically connected between said first main winding part and said auxiliary winding.

4. The motor of claim 3 wherein the distance between successive ones of the coil sets of said first and said second main winding parts is equal to at least 3/32 of an inch, as determined for at least one group of said successive coil sets.

5. In a permanent split capacitor motor designed for a rated voltage operation in a range between 400 and 600 volts, including a stator asssembly having winding receiving slots formed in it, said slots extending radially outwardly from a central bore opening, said slots having a closed bottom at one end and open to said bore on a second end, an insulation along said closed bottoms, the improvement which comprises windings in said slots constructed from a plurality of coil sets, said coil sets being arranged so as to reduce the voltage between said coil sets, said coil sets further being constructed from a plurality of wire turns, each of said wire turns being constructed from magnet wire, said magnet wire having an insulative coating about it, said windings including a first main winding part, an auxiliary winding electrically connected to said first main winding part and positioned adjacent said first main winding part in said slots so that at least some wire turns of said main and said auxiliary windings are contiguous with one another along the insulation coating of the magnet wire used to construct the auxiliary winding and first main winding part, a second main winding part electrically connected to said first main winding part, said second main winding part being separated from said auxiliary winding by said first main winding part, and a capacitor electrically connected between said auxiliary winding and said first main winding part, the voltage across said capacitor during operation of the motor being greater than the voltage between the coil sets of said auxiliary winding and said first main winding part.

6. The improvement of claim 5 further characterized by winding protective means electrically connected to said main winding.

7. The improvement of claim 6 wherein the distance between successive ones of the coil sets forming said first and said second main winding parts is equal to at least 3/32 of an inch, as determined for at least one group of said successive coil sets.

* * * * *